United States Patent [19]
Firlotte et al.

[11] Patent Number: 5,079,400
[45] Date of Patent: Jan. 7, 1992

[54] RESISTANCE WELDING TOOL

[75] Inventors: Clement A. Firlotte, Mentor; Kevin B. Garland, Madison; Joseph J. Scarpucci, Eastlake; James E. McNaughton, Painesville; Spencer J. Porter, Mentor, all of Ohio

[73] Assignee: ELTECH Systems Corporation, Boca Raton, Fla.

[21] Appl. No.: 628,552

[22] Filed: Dec. 17, 1990

[51] Int. Cl.$^5$ .............................................. B23K 11/28
[52] U.S. Cl. .................................. 219/86.21; 219/86.9
[58] Field of Search ................... 219/86.21, 86.25, 86.7, 219/86.9, 88

[56] References Cited

U.S. PATENT DOCUMENTS

| | | | |
|---|---|---|---|
| 2,675,454 | 4/1954 | Warner | 219/86.21 |
| 3,235,704 | 2/1966 | Rockwell, Jr. | 219/86.9 |
| 3,270,181 | 8/1966 | Wendler | 219/86.9 |
| 4,924,055 | 5/1990 | Nakahigasi et al. | 219/86.21 |

*Primary Examiner*—Clifford C. Shaw
*Attorney, Agent, or Firm*—John J. Freer

[57] ABSTRACT

A welding tool is disclosed comprising a working electrode and a ground electrode. A tool body comprises means for holding the electrodes in a contiguous, spaced-apart, side-by-side relationship. The electrodes are movable along parallel axes to and away from the tool body. A first compression spring biases the working electrode away from the tool body, and a second compression spring biases the ground electrode away from the tool body. The electrodes comprise stops by which the electrodes are positioned at a predetermined distance from the tool body against the bias of the compression springs. A switch responsive to movement of the working electrode, on movement from said predetermined distance toward the tool body, closes an electrical circuit to supply power to the electrodes. The welding tool comprises means by which the electrodes can be applied to a common side of the workpieces being welded, or to opposite aligned sides of the workpieces being welded.

14 Claims, 2 Drawing Sheets

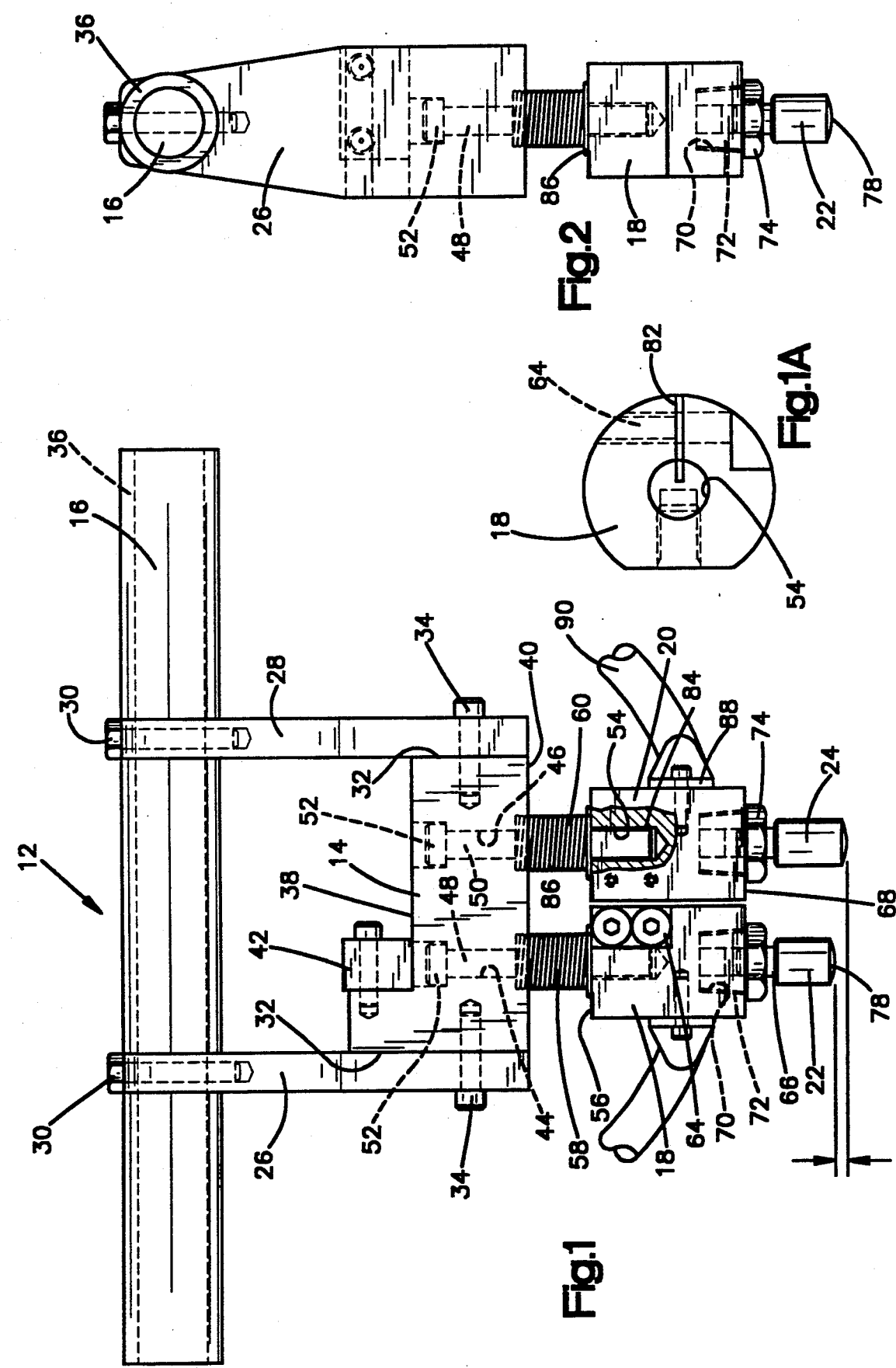

RESISTANCE WELDING TOOL

BACKGROUND OF THE INVENTION

1. Technical Field

The present invention relates to a hand-held resistance welding tool. The welding tool of the present invention is particularly useful for installing a mesh anode cathodic protection system onto a reinforced concrete structure.

2. Description of the Prior Art

U.S. Pat. No. 2,272,968 discloses a hand-held welding apparatus which has an inner plunger electrode and an outer sleeve electrode. Both electrodes are movable against the force of compression springs. The dimensions of the electrodes are such that the inner plunger electrode makes contact with a workpiece first. After contact is made by the inner electrode, the welding apparatus is then pressed against the workpiece until the outer sleeve electrode makes contact. Further movement of the welding apparatus against the workpiece causes a switch to close connecting the electrodes to a source of current.

The apparatus is useful for spot welding two flat plates together. Both electrodes are applied to one side of one of the plates. The apparatus is not useful for the installation of a mesh anode cathodic protection system to a reinforced concrete structure. It has been found, for such installation, that it is necessary to use a welding tool by which one electrode is applied to one workpiece and the other electrode is applied to the other workpiece. In this way, it is assured that the current flow will be through the interface between the workpieces, providing sufficient heat at the interface to effect the weld joint. In addition, it has been found advantageous, in the installation of a mesh anode cathodic protection system, to have a welding tool which has the capability of application of the electrodes to opposite sides of the workpieces, in some instances, as well as to the same sides of the workpieces, in other instances. The apparatus of U.S. Pat. No. 2,272,968 does not have either of these capabilities. Also, the electrodes in this patent all have special configurations requiring that they be custom machined. The electrodes are not standard resistance welding tool parts.

U.S. Pat. No. 2,644,067 discloses a spot welding apparatus which comprises a pair of electrodes. The electrodes are spaced apart, and supported by a cylindrical body which houses a transformer. Electrical current is supplied to the electrodes through a double-throw switch. The switch is closed by means of an operating handle which is spring mounted on the cylindrical body. The electrodes are not movable with respect to the body against the resistance of a compression spring. Thus, there is no automatic control over the amount of force applied by the electrodes to a workpiece during the welding step. In addition, the electrodes are spaced a substantial distance apart. This means that an excessive amount of power is expended in heating the workpieces, limiting the power available for making a weld. It is disclosed in the patent that for welding together a pair of thin sheets, using the apparatus of the patent, it is necessary to use a backing bar of conducting material to reduce resistance losses during the welding step. The continuous relocation of a backing bar, in the installation of a cathodic protection system onto a concrete structure, would be unduly burdensome.

U.S. Pat. No. 2,471,881 discloses a portable welding device. The device has opposed electrodes for welding two workpieces together from opposite sides of the workpieces. The electrodes are supported by members which can be replaced by other members for different types and sizes of work. The electrodes are not adjustable with respect to the amount of force applied by an electrode against a workpiece during the welding step. The device cannot be employed to weld together two workpieces by application of the electrodes to the same side of the workpieces.

SUMMARY OF THE INVENTION

The welding tool according to the present invention comprises a working electrode and a ground electrode. A tool body comprises means for holding the electrodes in a contiguous, spaced-apart, side-by-side relationship. The electrodes are movable along parallel axes to and away from the tool body. A first compression spring biases the working electrode away from the tool body and a second compression spring biases the ground electrode away from the tool body. The electrodes comprise stops by which the electrodes are positioned at a predetermined distance from the tool body against the bias of the compression springs. A switch responsive to movement of the working electrode on movement from said predetermined distance toward the tool body closes an electrical circuit to supply power to the electrodes. The welding tool comprises means by which the electrodes can be applied to a common side of the workpieces being welded, or to opposite aligned sides of the workpieces being welded.

One example of a suitable compression spring is a coil spring. Other forms of springs can also be used, for instance a stack of spring washers, e.g., Belleville springs. An advantage of the present invention is that each electrode has its own spring force. Thus, an electrode tip force, for one electrode, can be different from the tip force for the other electrode. Alternatively, the electrodes can have the same tip force. The compression springs of the welding tool are readily replaceable depending upon the electrode tip forces which are desired.

In one embodiment of the present invention, both electrodes comprise slightly rounded electrode tips. The electrode tip for the ground electrode is spaced slightly further from the tool body than the electrode tip for the working electrode. This reduces the chance of arcing during the welding procedure.

In another embodiment of the present invention, the electrodes comprise a first L-shaped electrode comprising an electrode shank and an electrode tip at about right angles to the electrode shank, and a second electrode having an electrode shank parallel to the first electrode shank and an electrode tip spaced from but aligned with the electrode tip of the first L-shaped electrode.

BRIEF DESCRIPTION OF THE DRAWINGS

Further features of the present invention will become apparent to those skilled in the art to which the present invention relates from reading the following specification with reference to the accompanying drawings, in which:

FIG. 1 is a front elevation view of a welding tool according to the present invention;

FIG. 1A is an enlarged top view of one of the electrode support collars of the welding tool of FIG. 1;

FIG. 2 is a side elevation view of the welding tool of FIG. 1;

DESCRIPTION OF PREFERRED EMBODIMENTS

Figure 4:
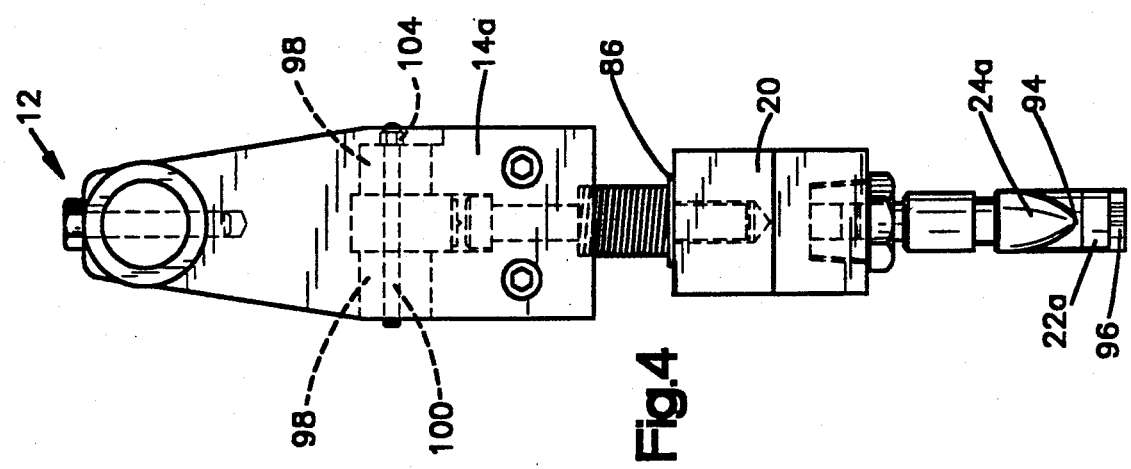
FIG. 4 is a side elevation view of the welding tool of FIG. 3.

Reinforced concrete structures comprise a plurality of steel reinforcing bars typically arranged in a grid pattern embedded in the concrete. The reinforcing bars are subject to corrosion due to a naturally induced flow of electrical current from one point of the steel reinforcement to another. Such corrosion is enhanced by moisture and salt contamination of the concrete. Cathodic protection applies an external direct current to the steel reinforcement from a current distribution anode which is in intimate contact with the concrete surface. The current from the distribution anode counteracts the corrosive current.

U.S. Pat. No. 4,900,410, assigned to the assignee of the present application, discloses an improved current distribution anode for concrete structures. The distribution anode is a valve metal mesh with a pattern of voids. The mesh is in the form of a roll, which is unrolled onto a surface of the concrete structure. The metals of the valve metal are elemental metals, such as titanium, tantalum, zirconium and niobium, as well as alloys of the elemental metals. A preferred valve metal is titanium, preferably an annealed titanium of low embrittlement having a percent elongation greater than 20.

The mesh may be prepared, by way of example, by expanding a sheet of metal by a factor from about ten times up to about thirty times its original area. This provides a series of strands in a diamond shaped pattern interconnected by a series of nodes. Within the above range of expansion factors, an expanded metal mesh may have from 500 to 2,000 nodes per square meter of mesh. The interconnected metal strands generally will have a thickness dimension corresponding to the thickness of the initial planar sheet or coil, in the range from about 0.05 centimeters to about 0.125 centimeters. The nodes will have a double-strand thickness of about 0.1 centimeters to about 0.25 centimeters. The width dimension of the strands may be from about 0.05 centimeters to about 0.20 centimeters. The expanded mesh should have at least 80% void fraction for efficiency and economy of cathodic protection. Preferably, the expanded metal mesh will have a void fraction of at least about 90% up to about 96%, while still supplying sufficient metal for economical current distribution. An expanded metal mesh roll can be coiled in prepared lengths typically from about 40 to about 200 meters. The mesh provides a current density, under normal operating conditions, up to about 10 amps per square meter of metal surface area.

In a typical application, the anode mesh is unrolled from its roll onto a surface. The surface can be the surface of a concrete structure, for instance, a bridge deck, or the anode mesh can be unrolled initially onto a separate surface removed from the concrete structure, and when partially assembled with other components, applied to the concrete structure. For purposes of this application, it will be described as unrolled onto a concrete structure. When unrolled, it is affixed to the surface by the use of clips, at spaced locations on the surface. Before or after fixing, the mesh is spot welded to transverse current distributor strips which most generally are laid beneath the mesh. The current distributor strips are also valve metal, most always titanium metal, strips. The mesh will normally be welded to the current distributor strips at each mesh node, or at a selected number of the nodes across the width of the mesh. The current distributor strips are welded to a sufficient number of nodes to provide a sufficient number of redundant current carrying paths in the mesh. A rectifier lead wire is attached to each distributor strip to provide electrical current to the anode mesh network. The disclosure of U.S. Pat. No. 4,900,410 is incorporated by reference herein.

The metal mesh of U.S. Pat. No. 4,900,410 is marketed by the ELGARD Corporation under the trademark ELGARD. The mesh is usually manufactured in about four foot wide rolls. To cover a wide surface of a concrete structure, a number of rolls are laid on the surface of the concrete structure in side-by-side relationship. To conduct current to a metal mesh of a second roll, third roll, or additional rolls, it may be necessary to splice the current distributor strips together. In this step, the distributor strips are overlapped at a weld point, and then spot welded at that point.

In both of the above welding procedures, the welding is carried out by resistance welding. In connecting the current distributor strips by spot welding the strips to nodes of the expanded mesh, or in splicing one current distributor strip to another, it is necessary that sufficient current flow through the interface between the mesh nodes and distributor strips, or overlapped portions of the distributor strips, to effect the weld joint.

A third welding procedure involved in the installation of a cathodic protection system is connecting the reinforcing steel bars electrically together so that all of the reinforcing bars receive current flow from the distributor mesh anode. A conventional method for electrically connecting steel reinforcing bars together is known as "Thermite welding". Insulated copper wires or bars are laid on the reinforcing steel bars. A graphite mold is placed on top of a junction point. The mold is filled with a thermite-weld charge. The charge is ignited, for instance, by a spark, causing the charge to melt so that it flows down onto and around the junction point. This insulates the junction point from galvanic corrosion. This method is very expensive, and in certain instances, such as in high winds, difficult to carry out.

It has also been proposed to electrically connect the reinforcing bars together by simply welding one reinforcing bar of a grid pattern to another bar. This welding is carried out by means of a welding tool by which one electrode presses against the underside of one of the reinforcing bars and the other electrode presses against the top of the other reinforcing bar. In welding the reinforcing bars together, it is necessary to prepare the surfaces being welded, for instance, by a surface grinding, to achieve good electrical contact between the steel bars and the welding tool electrodes. Whereas a top surface of one reinforcing bar can be easily surface prepared, it is impossible to do this with an underside surface which is difficult to reach. Corrosion on the underside surface can prevent a good weld due to high electrical resistance and low current flow. This procedure also requires a large power source that is cumbersome and often impractical to use.

Another method is known as the "SMAW" (shielded metal arc welding) method. This uses a consumable stick welding electrode. An arc is struck between the consumable stick electrode and the reinforcing bar. The stick electrode is then held at the junction point of the reinforcing bar and a connecting rod for a sufficient time to not only heat the junction point, but also to melt the stick electrode at its tip. This allows metal to flow down to and around the junction point joining the connecting rod and the reinforcing bar. This method generally requires the use of fairly large diameter connecting rods, e.g., more than 3/16 inch diameter, requiring substantial exposure of the bars to heat. Thus, the method cannot be used except near the ends of reinforcing bars, since the heat destroys the temper in the bars. Another disadvantage with this method is that it requires a massive power source, for instance about 220–240 KVA. If thin wires are used to connected the reinforcing bars, the wires at the weld point vaporize and a weak bar-to-wire connection is obtained.

The welding tool of the present invention is one that can be used with all three of the above welding procedures, thus significantly increasing the efficiency of installation of mesh cathodic protection systems onto reinforced concrete surfaces. In addition, the welding tool overcomes the above-mentioned disadvantages experienced with each of the welding procedures of prior art cathodic protection systems.

Referring to FIGS. 1, 1A and 2, a welding tool 12, in accordance with the present invention, comprises a body 14, a handle 16, and electrode supporting collars 18, 20. The electrode supporting collar 18 supports a working electrode 22, and the electrode supporting collar 20 supports a ground electrode 24. The handle 16, in the form of a bar, has a foam rubber handle cover 36. The handle 16 is attached to brackets 26, 28 by means of screws 30. The brackets 26, 28 are, in turn, attached to the opposite sides 32 of body 14 by means of screws 34.

The handle 16, and handle cover 36, have a length by which they extend beyond brackets 26, 28. This permits the handle, on cover 36, to be readily grasped by both hands of an operator at the handle ends, providing better operator control during welding.

The tool body 14 has a generally cubical configuration with an upper surface 38 and an underside 40. A switch 42 is seated on the upper surface 38. The tool body 14 is provided with two side-by-side bores 44, 46 which extend between the upper surface 38 of the tool body and the underside 40. A pin 48 is slidable in bore 44 and a pin 50 is slidable in bore 46. Both bores 44, 46 are countersunk at the upper surface 38 to receive heads 52 of pins 48, 50 which limit the downward movement of the pins 48, 50.

The electrode supporting collars 18, 20 are generally rod shaped and have sockets 54 which are bored into the upper surfaces 56 of the collars. The sockets 54 receive the lower ends of pins 48, 50. The collars 18, 20 have open compression slots 82, FIG. 1A, along the sides thereof, which are substantially coextensive, axially, with the sockets 54 and extend radially into the sockets. Screws 64 extend across the slots 82, and can be turned to close the slots and tighten the collars 18, 20 on the lower ends of pins 48, 50. This attaches the collars 18, 20 to the pins 48, 50. The pins 48, 50 are electrically insulated from the supporting collars 18, 20 by electrical insulation bushings 84 seated within the sockets 54.

Compression springs 58, 60 are positioned between the upper surfaces 56 of the supporting collars 18, 20 and the underside 40 of the body 14. The compression springs 58, 60 shown in the Figures are coil springs and the pins 48, 50 extend downwardly through the springs 58, 60. Instead of coil springs, a plurality of stacked spring or Belleville washers can also be used. The body 14, on underside 40, is countersunk at bores 44, 46 providing seats for the two springs 58, 60. Insulating washers 86 between the springs 58, 60 and upper surfaces 56 of the collars 18, 20 electrically insulate the springs from the collars.

As can be seen from FIGS. 1 and 2, the compression springs 58, 60 provide forces which bias the supporting collars 18, 20 downwardly away from body 14. The supporting collars 18, 20 are movable upwardly towards body 14 against compression of the compression springs 58, 60. However, downward movement of the supporting collars 18, 20 away from body 14 is limited by heads 52 of pins 48, 50. The switch 42 is positioned above bore 44 for pin 48 so that upward movement of the pin 48 closes the switch. Details of the switch are not shown in the drawings. The switch is a conventional switch, such as a microswitch, which is commercially available.

Each compression spring 58, 60 provides an electrode tip force. The electrode tip forces provided by the springs 58, 60 can be the same, or different depending upon the application involved and electrode tip forces desired.

The electrode supporting collars 18, 20 have lead connections 88 to which cables 90 are attached. The electrode supporting collar 18, for the working electrode 22, is electrically connected to the return terminal on the secondary side of a conventional welding transformer, and the supporting collar 20, for the ground electrode 24, is electrically connected to the power supply terminal on the secondary side of the welding transformer (not shown). The switch 42 is electrically connected, in a conventional manner, by a lead (not shown), to the alternating current primary side of the welding transformer. Closing the switch 42 closes the alternating current circuit providing power from the transformer to the welding tool 12 through cables 90. The primary circuit of the transformer includes a timer which is set so that the current flow through the transformer is maintained for only a short period of time, for instance about 80–240 milliseconds.

The underside 68 of each electrode supporting collar 18, 20 is provided with a tapered socket 70 which is internally threaded with a standard pipe thread. Each socket 70 receives an externally threaded electrode adapter 72. The adapters 72 are in the form of a pipe having a hex head 74 at one end. An electrode shank 66 extends into each adapter 72. Tightening the adapter 72 into a tapered socket 70, of a collar 18, 20 by turning on hex head 74 causes the adapter 72 to tighten on shank 66 securely holding the shank. The adapter is turned until hex head 74 bears against the underside of a collar 18, 20. This locks the adapter to the collar.

Each electrode 22, 24 is a female member and is held on an electrode shank 66 by a friction fit in which an electrode is lightly tapped onto a shank 66. The electrodes 22, 24 are removable by placing a tool against the top side of the electrodes and tapping them loose.

As shown in FIG. 1, the electrode tip for the ground electrode 24 is slightly further removed from the body 14 than the electrode tip for the working electrode 22. This makes it easier for the operator to touch the ground electrode to a workpiece first and avoid arcing during the weld procedure.

An advantage of the present invention is that many of the above parts such as the collars 18, 20, adapters 72, electrode shanks 66 and electrodes 22, 24 can all be standard resistance welding tool parts reducing machining costs for manufacturing the welding tool of the present invention. By the terminology "standard resistance welding tool parts", it is meant standard tool parts, for instance, those approved by the Resistance Welding Manufacturers' Association (RWMA).

In the embodiment shown in FIGS. 1 and 2, the electrodes 22, 24 have essentially a rod shape and are rounded at tips 78. The configuration of the electrodes and electrode tips is useful for, by way of example, welding a connecting wire to a plurality of reinforcing bars of a concrete structure, or alternatively welding a distributor strip to a wire mesh anode.

In the case of the former, the connecting wires are laid onto and across the reinforcing bars. The ground electrode 24 (on the right hand side of the tool, in FIG. 1) is first engaged with a reinforcing bar near a point of contact of a connecting wire with the reinforcing bar. An operator pushes down on the handle 16 against the force of the compression spring 60. This causes the working electrode 22 (on the left hand side of the tool, in FIG. 1) to make contact with the connecting wire at the point of contact of the wire with the reinforcing bar. Further downward pressure on handle 16 causes the working electrode pin 48 to move upwardly, for instance about 0.1–0.3 centimeters, to close switch 42. This closes the power circuit on the alternating current side of a transformer, causing power to flow to the electrodes and through the workpieces between the electrodes. The transformer timer in the primary circuit is set for a current flow for a predetermined amount of time. During this period, the welding tool 12 delivers a predetermined current.

In the case of welding a distributor strip to a wire mesh anode, essentially the same procedure is followed. The ground electrode 24 is brought into contact with a distributor strip at a point near where a wire mesh node overlaps the distributor strip. An operator presses down on the welding tool until the ground electrode makes contact with the wire mesh node. Further downward pressure closes switch 42.

Figure 3:
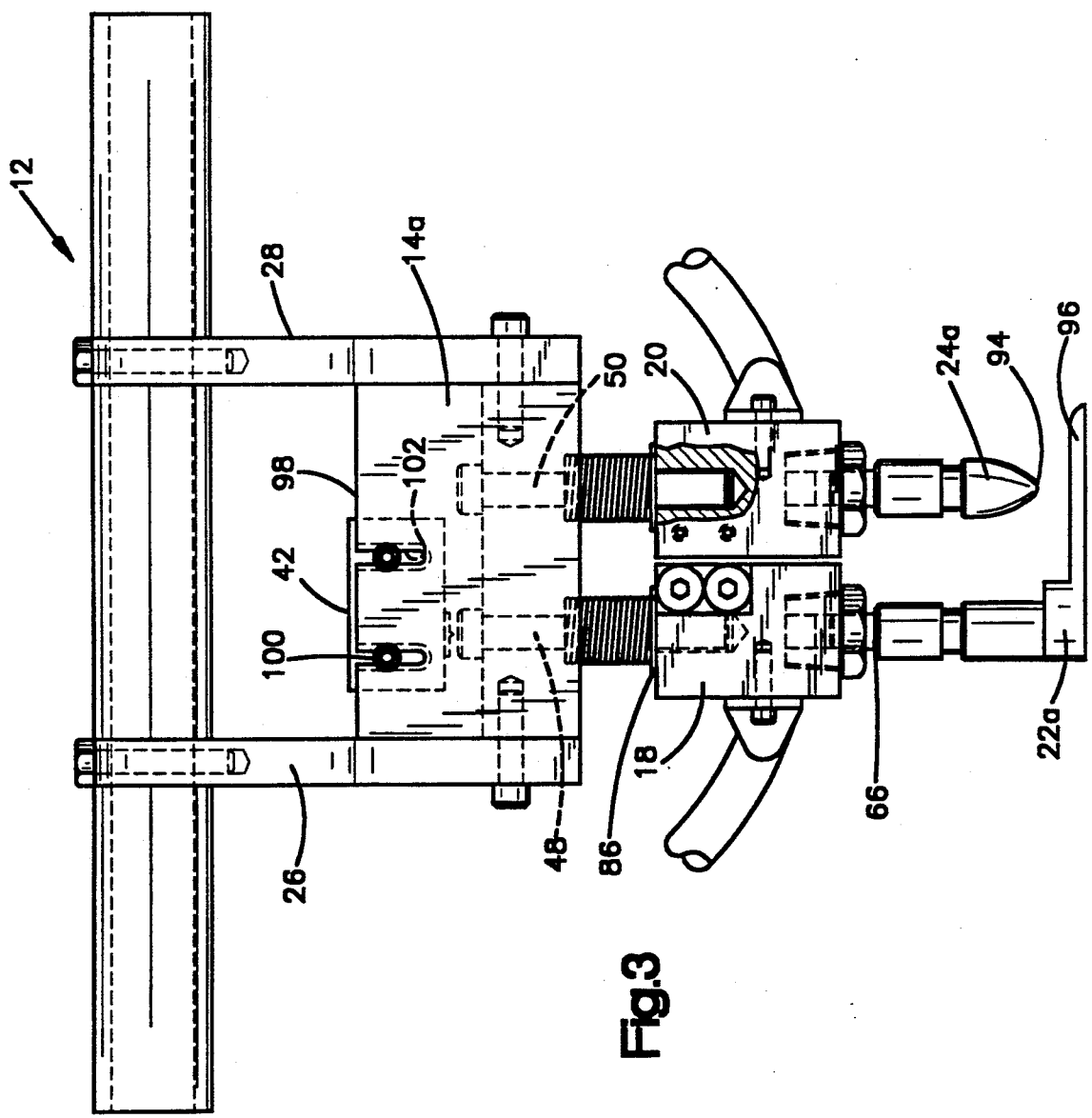
FIG. 3 is a front elevation view of a welding tool in accordance with an embodiment of the present invention.

Referring to FIGS. 3 and 4, the welding tool is essentially the same as in FIGS. 1 and 2. The component parts of the welding tool which are essentially the same as in FIGS. 1 and 2, have the same numbering. Those that are different are distinguished by the use of the suffix "a". The welding tool of FIGS. 3 and 4 differs from that of FIGS. 1 and 2 primarily in the configuration of the electrodes and location of the switch 42. In the embodiment of FIGS. 3 and 4, the working electrode 22a is essentially L-shaped. The ground electrode 24a is similar to the electrode 24 of FIGS. 1 and 2, except that the ground electrode tip has a more sharply tapered point 94. The L-shaped electrode 22a has a flattened arm 96 which extends beneath the point 94 of the ground electrode 24a. The spacing between the ground electrode point 94 and the working electrode arm 96 is about ⅛ inch. The configuration of the electrodes is useful for such applications as splicing together the ends of distributor strips for the cathodic protection system. The arm 96 is slipped beneath a point of connection and bears against a firm surface, on its underside, for instance the surface of the concrete structure. The interface between the overlapping strips is positioned between the arm 96 and electrode tip 94 of the ground electrode 24a. An operator presses down on the welding tool until both electrodes 22a and 24a press against opposite sides of the overlapping strips. Further downward movement by the operator of the welding tool causes the pin for the working electrode 22a to engage the switch 42, closing the power circuit to the welding tool.

In the embodiment of FIGS. 3 and 4, the switch 42 is positioned between surfaces 98, FIG. 4, of the tool body 14a so that it is protected from damage by the tool body surfaces. The switch 42 is held by bolts 100 which are seated in slots 102 of the tool body surfaces 98. Locking nuts 104 on the bolts 100 engage the surfaces 98 of the tool body holding the switch 42 in position. The switch 42 is adjustable upwardly or downwardly by loosening nuts 104. This permits varying the force exerted by the compression springs 58, 60 against the workpieces being welded together. If the switch 42 is moved upwardly, this increases the forces exerted by the electrode tips on the workpieces during the period of current flow. If the switch 42 is moved downwardly, this decreases the forces exerted by the electrode tips during the period of welding An advantage of the present invention is that the welding tool can be used, for most circumstances, with a single combination of settings, e.g., electrode tip forces, timer speed, and power (KVA), for all three of the aforementioned applications. However, if desired, depending upon circumstances, different settings can be used. The transformer power and transformer timer are readily adjustable. The arrangement of component parts allows each electrode tip to have its individual tip force. In addition, the tip forces are adjustable. The electrode tip forces, in the embodiment of FIGS. 3 and 4, are adjustable by movement of switch 42. If further adjustment is desired in the embodiment of FIGS. 3 and 4, or if adjustment is desired in the embodiment of FIGS. 1 and 2, the tool can be readily disassembled, and springs 58, 60 can be replaced with springs of different forces. It may be desirable to have different electrode tip forces in a particular application. This can be accomplished by using springs 58, 60 having different compression forces. The proper tip forces and springs can be selected for different applications. An almost infinite range of tip forces can be obtained. For instance, in making a steel-to-steel weld, steel is a good electrical conductor. A less efficient contact between the workpieces at the point of the weld may be desired in order to generate enough heat to make the weld. In this instance, the desired tip force for the working electrode may be less than that for the ground electrode. In making a titanium-to-titanium weld, titanium is a poorer electrical conductor than steel, and a relatively large tip force for the working electrode, at the point of the weld, compared to that for the ground electrode, may be desired.

It should be understood that the welding tool embodiment of FIGS. 3 and 4 can be used with the electrodes of FIGS. 1 and 2 and that the tool of the embodiment of FIGS. 1 and 2 can be used with the electrodes of FIGS. 3 and 4. Since the electrodes and other component parts of the welding tool of the present invention are standard RWMA parts, one electrode is replaceable by another simply by tapping it loose from an electrode shank 66 and tapping a differently configured electrode onto the shank.

Other advantages of the present invention should also be apparent. Primarily, the present invention provides a light-weight, versatile welding tool which is capable of performing several different welding procedures. The welding tool of the present invention is particularly useful for performing the several welding procedures required for installing a mesh anode cathodic protection system onto a reinforced concrete surface. The welding tool of the present invention can execute the several welding procedures by application of the electrodes to the same side of the workpieces being welded together or to opposite sides. The design of the welding tool is such that the electrodes contact different workpieces so that the current flows through the interface between the workpieces.

The welding tool of the present invention has set contact forces of the electrodes against the workpieces for the proper flow of current across the interface between the workpieces to make the weld joint. The contact forces can be calibrated for the welding procedures or for the workpieces by replacing the electrode springs with springs having different spring forces. In the embodiment of FIGS. 3 and 4, the spring force during welding can also be adjusted by adjustment of the position of the switch 42 on the tool body 14a. By positioning the electrodes close together in a contiguous relationship, the current path through the workpieces is held to a minimum. This reduces the amount of power consumed in heating the workpieces, reducing the size of the power supply required. For instance, the tool of the present invention requires a power output which is as low as 0.5-4 KVA as compared to 220-240 KVA for conventional shielded metal arc welding. The proximity of the electrodes to each other permits the spot welding of two workpieces to be carried out without the need for a conductive backing bar. In the present invention, the welding of connecting wires to reinforcing steel can be carried out without heating the steel to such a high temperature as to destroy the temper of the steel. Thus, the welding tool in this procedure can be used across the entire surface of a bridge deck or other structure. Further, the welding tool of the present invention is capable of efficiently executing the welding steps in all of the procedures required for a cathodic protection installation, substantially reducing the cost of such an installation.

From the above description of preferred embodiments of the invention, those skilled in the art will perceive improvements, changes and modifications. Such improvements, changes and modifications within the skill of the art are intended to be covered by the appended claims.

Having described the invention, the following is claimed:

1. A welding tool for resistance welding together plural parts comprising:
   a working electrode support;
   a ground electrode support;
   a tool body including means holding said electrode supports in a contiguous spaced-apart side-by-side relationship, said electrode supports being movable along parallel axes to and away from said tool body;
   a first compression spring biasing said working electrode support away from said tool body;
   a second compression spring biasing said ground electrode support away from said tool body;
   stop means positioning said electrode supports against the bias of said compression springs at a predetermined distance away from said tool body; and
   an electrical circuit including a switch having open and closed positions to open and close said circuit;
   said working electrode support comprising means engaging and closing said switch with movement of said working electrode support from said predetermined distance toward said tool body.

2. The welding tool of claim 1 including means for adjusting the position of said switch to adapt the pressure exerted by said compression spring to said plural parts.

3. The welding tool of claim 2 comprising means for application of the electrodes to a common side of the pieces being welded.

4. The welding tool of claim 3 wherein both of said electrodes have tapered ends.

5. The welding tool of claim 4 wherein the ground electrode tip and the working electrode tip are on parallel spaced apart axes, the ground electrode tip having a biased position further removed from the tool body than the working electrode tip.

6. The welding tool of claim 2 comprising means for application of the electrodes to opposite aligned sides of the pieces being welded.

7. The welding tool of claim 6 wherein one of said electrodes has an L-shaped configuration.

8. A welding tool for resistance welding comprising:
   a handle;
   a body;
   means securing the handle to said body permitting manipulation of said body through said handle;
   a working electrode assembly and a ground electrode assembly, each electrode assembly comprising:
   (a) an electrode including an electrode tip;
   (b) a collar supporting said electrode;
   (c) a current lead attached to said collar; and
   (d) a supporting pin for said collar;
   said body comprising spaced-apart aperture means receiving said supporting pins and holding said electrode assemblies in a contiguous spaced-apart side-by-side relationship, said supporting pins being longitudinally slidable in said aperture means;
   spring means biasing said electrode collar assemblies away from said bodies;
   a switch having open and closed positions engageable by the working electrode assembly supporting pin to close said switch with compression of the spring means therefore, closing of the switch initiating the flow of current through said electrodes.

9. The tool of claim 8 wherein said body has a lateral dimension at right angles to the alignment of said aperture means, said handle comprising portions extending laterally beyond the confines of said body, permitting manipulation of the tool by grasping both said portions.

10. A welding tool for resistance welding together plural parts comprising:
   a working electrode;
   a working electrode support;
   a ground electrode;
   a ground electrode support;
   a tool body including means holding said electrode supports in a contiguous spaced-apart side-by-side relationship, said electrode supports being movable along parallel axes to and away from said tool body;
   a first spring biasing said working electrode support away from said tool body;

a second spring biasing said ground electrode support away from said tool body;

stop means positioning said electrode supports against the bias of said springs at a predetermined distance away from said tool body;

said first and second springs providing a working electrode tip force and a ground electrode tip force, said tip forces being independently set by said springs; and an electrical circuit including a switch having open and closed positions to open and close said circuit, said working electrode support comprising means engaging and closing said switch said compression of the working electrode spring.

11. The tool of claim 10 including means for adjusting the tip force set by at least one of said springs.

12. The tool of claim 11 comprising means for adjusting the position of said switch to adjust the tip force exerted by said working electrode.

13. The tool of claim 12 wherein said springs are coil springs.

14. The tool of claim 12 wherein the ground electrode tip is spaced further from the tool body than the working electrode tip.

* * * * *